(12) United States Patent
Boutros et al.

(10) Patent No.: US 10,958,462 B2
(45) Date of Patent: **\*Mar. 23, 2021**

(54) USING A CENTRAL CONTROLLER CLUSTER TO CONFIGURE A DISTRIBUTED MULTICAST LOGICAL ROUTER

(71) Applicant: Nicira, Inc., Palo Alto, CA (US)

(72) Inventors: Sami Boutros, Union City, CA (US); Alexander Tessmer, Mountain View, CA (US); Subin Cyriac Mathew, San Jose, CA (US); Ganesan Chandrashekhar, Campbell, CA (US); Vivek Agarwal, Campbell, CA (US)

(73) Assignee: NICIRA, INC., Palo Alto, CA (US)

( * ) Notice: Subject to any disclaimer, the term of this patent is extended or adjusted under 35 U.S.C. 154(b) by 65 days.

This patent is subject to a terminal disclaimer.

(21) Appl. No.: 16/276,598

(22) Filed: Feb. 14, 2019

(65) Prior Publication Data

US 2019/0182061 A1  Jun. 13, 2019

Related U.S. Application Data

(63) Continuation of application No. 15/652,203, filed on Jul. 17, 2017, now Pat. No. 10,218,523.

(51) Int. Cl.
*H04L 12/18* (2006.01)
*H04L 12/28* (2006.01)
(Continued)

(52) U.S. Cl.
CPC ........ *H04L 12/185* (2013.01); *H04L 12/1886* (2013.01); *H04L 41/0893* (2013.01);
(Continued)

(58) Field of Classification Search
CPC ... H04L 45/16; H04L 12/185; H04L 12/1836; H04L 12/1886; H04L 29/06027;
(Continued)

(56) References Cited

U.S. PATENT DOCUMENTS

| | | |
|---|---|---|
| 5,079,767 A | 1/1992 | Perlman |
| 5,128,926 A | 7/1992 | Perlman et al. |

(Continued)

FOREIGN PATENT DOCUMENTS

| | | |
|---|---|---|
| GB | 2529705 A | 3/2016 |
| WO | 2019018261 A1 | 1/2019 |

*Primary Examiner* — Sai Aung
(74) *Attorney, Agent, or Firm* — Adeli LLP

(57) ABSTRACT

For a managed network implementing at least one logical router having centralized and distributed components, some embodiments provide a method for configuring a managed forwarding element (MFE) executing on a first host machine to implement a distributed multicast logical router and multiple logical switches logically connected to the logical router in conjunction with a set of additional MFEs executing on additional host machines to process multicast data messages. The method receives a multicast group report from a data compute node (DCN) that executes on the first host, sends a summarized multicast group report indicating multicast groups joined by DCNs executing on the first host to a set of central controllers, receives data based on an aggregated multicast group report from the set of central controllers, and uses the data based on the aggregated multicast group report to configure the MFE to implement the distributed multicast logical router.

18 Claims, 8 Drawing Sheets

(51) Int. Cl.
*H04L 12/24* (2006.01)
*H04L 12/721* (2013.01)
*H04L 12/46* (2006.01)

(52) U.S. Cl.
CPC ...... *H04L 12/4633* (2013.01); *H04L 12/4641* (2013.01); *H04L 45/44* (2013.01)

(58) Field of Classification Search
CPC ... H04L 45/04; H04L 65/403; H04L 65/4076; H04L 45/021; H04L 12/18; H04L 12/4641; H04L 45/586; H04L 45/745; H04L 69/167; H04L 12/189; H04L 45/00; H04L 45/22; H04L 45/28
See application file for complete search history.

(56) References Cited

U.S. PATENT DOCUMENTS

| | | | |
|---|---|---|---|
| 7,317,722 B2 | 1/2008 | Aquino et al. | |
| 7,925,778 B1 | 4/2011 | Wijnands et al. | |
| 8,111,633 B1 | 2/2012 | Aggarwal et al. | |
| 8,665,887 B2 | 3/2014 | Ge et al. | |
| 9,043,452 B2 | 5/2015 | Fulton | |
| 9,270,585 B2 | 2/2016 | Manion et al. | |
| 10,015,643 B2 | 7/2018 | Zuniga et al. | |
| 10,218,523 B2 | 2/2019 | Boutros et al. | |
| 10,523,455 B2 | 12/2019 | Boutros et al. | |
| 2003/0088696 A1* | 5/2003 | McCanne | H04L 29/06027 709/238 |
| 2003/0165140 A1 | 9/2003 | Tang et al. | |
| 2004/0258003 A1* | 12/2004 | Kokot | H04L 12/2898 370/254 |
| 2009/0147786 A1 | 6/2009 | Li et al. | |
| 2009/0279701 A1* | 11/2009 | Moisand | H04L 12/2856 380/270 |
| 2011/0158113 A1 | 6/2011 | Nanda et al. | |
| 2011/0211517 A1 | 9/2011 | Moscibroda et al. | |
| 2012/0033668 A1 | 2/2012 | Humphries | |
| 2013/0044641 A1 | 2/2013 | Koponen et al. | |
| 2013/0058229 A1 | 3/2013 | Casado et al. | |
| 2013/0103817 A1 | 4/2013 | Koponen et al. | |
| 2013/0107699 A1 | 5/2013 | Miclea | |
| 2013/0114466 A1 | 5/2013 | Koponen et al. | |
| 2013/0117428 A1 | 5/2013 | Koponen et al. | |
| 2013/0117429 A1 | 5/2013 | Koponen et al. | |
| 2013/0128886 A1* | 5/2013 | Shah | H04L 12/18 370/390 |
| 2013/0188521 A1 | 7/2013 | Jain | |
| 2013/0287026 A1 | 10/2013 | Davie | |
| 2013/0322443 A1* | 12/2013 | Dunbar | H04L 12/185 370/390 |
| 2014/0064142 A1 | 3/2014 | Mylarappa et al. | |
| 2014/0098815 A1* | 4/2014 | Mishra | H04L 45/021 370/390 |
| 2014/0185613 A1 | 7/2014 | Sato | |
| 2014/0198661 A1 | 7/2014 | Raman et al. | |
| 2014/0328159 A1 | 11/2014 | Rebella et al. | |
| 2015/0009995 A1 | 1/2015 | Gross et al. | |
| 2015/0016286 A1 | 1/2015 | Ganichev et al. | |
| 2015/0016460 A1 | 1/2015 | Zhang et al. | |
| 2015/0016469 A1 | 1/2015 | Ganichev et al. | |
| 2015/0055651 A1 | 2/2015 | Shen et al. | |
| 2015/0055652 A1 | 2/2015 | Yong et al. | |
| 2015/0058968 A1 | 2/2015 | Wang et al. | |
| 2015/0063364 A1 | 3/2015 | Thakkar et al. | |
| 2015/0103843 A1 | 4/2015 | Chandrashekhar et al. | |
| 2015/0139238 A1 | 5/2015 | Pourzandi et al. | |
| 2015/0263899 A1 | 9/2015 | Tubaltsev et al. | |
| 2015/0281125 A1 | 10/2015 | Koponen et al. | |
| 2016/0092257 A1 | 3/2016 | Wang et al. | |
| 2016/0092259 A1 | 3/2016 | Mehta et al. | |
| 2016/0094365 A1 | 3/2016 | Subramaniyam et al. | |
| 2016/0094366 A1 | 3/2016 | Wang et al. | |
| 2016/0094396 A1 | 3/2016 | Chandrashekhar et al. | |
| 2016/0094398 A1 | 3/2016 | Choudhury et al. | |
| 2016/0105333 A1 | 4/2016 | Lenglet et al. | |
| 2016/0226671 A1 | 8/2016 | Lemoine | |
| 2016/0241410 A1 | 8/2016 | Lemoine | |
| 2019/0020490 A1 | 1/2019 | Boutros et al. | |
| 2019/0020491 A1 | 1/2019 | Boutros et al. | |
| 2019/0020492 A1 | 1/2019 | Boutros et al. | |

\* cited by examiner

USING A CENTRAL CONTROLLER CLUSTER TO CONFIGURE A DISTRIBUTED MULTICAST LOGICAL ROUTER

CLAIM OF BENEFIT TO PRIOR APPLICATIONS

This application is a continuation application of U.S. patent application Ser. No. 15/652,203, filed Jul. 17, 2017, now published as U.S. Patent Publication 2019/0020492. U.S. Patent Publication 2019/0020492 is hereby incorporated by reference.

BACKGROUND

In current implementations, multicast data messages sent in a logical network are replicated to all virtual extensible local area network (VXLAN) tunnel endpoints (VTEPs) participating in the logical network. In some cases, a multicast data message is processed by a logical router and sent over each logical switch of the logical network to each VTEP in the logical network. This results in multiple unnecessary multicast data messages being sent over the physical network and additional processing at each VTEP for the unnecessary multicast data messages. There is therefore a need for a system that can process multicast data messages that originate and terminate in a logical network to be processed in a distributed fashion to reduce duplicative data messages.

BRIEF SUMMARY

For a managed network, some embodiments provide a method for a set of host machines to populate a multicast forwarding table of the host machine with information identifying a set of host machines that have reported joining at least one multicast group, receiving a multicast data message for the at least one multicast group from the at least one DCN, and using the multicast forwarding table to forward the multicast data message to the set of host machines identified in the multicast forwarding table.

In some embodiments, MFEs implement a distributed multicast logical router and multiple logical switches to process the multicast data messages. The method sends, from a managed forwarding element (MFE) implementing the distributed multicast logical router, a multicast group query (e.g., an internet group management protocol (IGMP) query) to a set of data compute nodes (DCNs) (e.g., virtual machines, containers, etc.) that are logically connected to one of several logical switches and that execute on the same host machine as the managed forwarding element. The method receives multicast group reports from a subset of the set of DCNs and at least one of the multicast group reports specifies a multicast group of interest. The method distributes, to a set of MFEs executing on other host machines, a summarized multicast group report specifying a set of multicast groups of interest to the first MFE (i.e., multicast groups that the first MFE participates in). In some embodiments, the summarized multicast group report specifies the multicast groups specified in the multicast group reports received from the subset of DCNs.

In some embodiments, the summarized multicast group report is sent to a central controller or central controller cluster (e.g., a central control plane (CCP)). The central controller receives summarized multicast group reports from multiple MFEs executing on multiple host machines and generates aggregated distributed multicast logical router configuration information based on the summarized multicast group reports. The central controller cluster generates at least one multicast group report that the MFEs can use to populate output lists for replicating multicast group data messages. The central controller cluster distributes (e.g., through a local controller) the generated multicast group report to the MFEs implementing the distributed multicast logical router and logical switches. In some embodiments, the generated summarized report is an IGMP report, or set of IGMP reports. In other embodiments, the generated summarized report is a report including information that will allow a host machine to populate an output list (e.g., and mroute list) for a multicast group with remote MFEs or tunnel endpoints executing on remote host machines, such as a virtual extensible local area network (VXLAN) tunnel endpoint (VTEP) to which a multicast data message for the multicast group will be replicated.

In other embodiments, the summarized multicast group report is distributed directly to other MFEs implementing the distributed logical multicast router and to an MFE implementing a local multicast router executing as part of an edge node. In some embodiments, the summarized multicast group reports are sent over a particular logical switch (e.g., a transit logical switch) that is not logically connected to any DCNs but is logically connected to the distributed logical multicast router and the edge multicast router executing as part of an edge node and acting as the local multicast router for the logical network. A local multicast router for a logical network in some embodiments is a particular router at the logical network edge that receives and distributes multicast data messages for the logical network and communicates interest in multicast groups to external routers (e.g., using protocol independent multicast (PIM)).

The MFEs including the first MFE, in some embodiments, use the summarized reports received from other MFEs to populate a multicast routing list for replicating data messages for the multicast groups indicated in the summarized report with an identifier for the source MFE or a tunnel endpoint (e.g., a VTEP) executing on the same host machine as the source MFE. In some embodiments, the multicast routing list also includes an output list indicating the logical switches that have local DCNs that participate in the multicast group. The method receives additional summarized multicast group reports from other host machines as they are sent out and uses them to maintain a current multicast routing list for replicating multicast data messages to the appropriate host machines (or MFEs executing on the host machines).

In some embodiments, the logical switches over which multicast group reports are sent generate logical switch output lists that identify individual DCNs and the distributed router for which a multicast data message for a particular multicast group are replicated. The logical switch in some embodiments includes a snooping function that populates the logical switch output list. In some embodiments, the logical switch output list is populated based on the data received from the multicast group reports or the central controller. It is understood that these methods of populating the output list are not exclusive and that in some embodiments both snooping and the summarized report are used to populate the output list.

In some embodiments, an MFE implementing the distributed multicast logical router acts as a multicast group proxy for the compute nodes executing on the same host machine and responds to multicast group queries sent by an edge multicast router executing as part of an edge node and acting as the local multicast router for the logical network.

In some embodiments, a method is provided for processing multicast data messages at a first managed forwarding element (MFE) executing on a first host machine that implements a distributed multicast logical router and multiple logical switches logically connected to the logical router in conjunction with a set of additional MFEs executing on additional host machines. The method receives a multicast data message for a multicast group from a source data compute node (DCN), operating on the first host machine, that logically connects to a first logical switch of the multiple logical switches. The method replicates the multicast data message to a set of DCNs in the multicast group that also operate on the first host machine. In some embodiments, the set of DCNs includes at least one DCN logically connected to the first logical switch and, in some embodiments, another DCN logically connected to a second logical switch.

In some embodiments, the method replicates to the set of DCNs operating on the first machine by first replicating to DCNs logically connected to the first logical switch and to a logical router connected to the first logical switch. The method then logically replicates, in some embodiments, the multicast data message to other logical switches that have DCNs operating on the first host machine that have reported participating in the multicast group, for the other logical switches to replicate to those DCNs.

The method also replicates the multicast data message to other MFEs in the set of MFEs that have reported participating in the multicast group. In some embodiments, the method replicates the multicast data message to the other MFEs using an identifier of the first logical switch. In some embodiments, the other MFEs replicate to local DCNs by replicating the multicast data message to a set of DCNs logically connected to the first logical switch. In some embodiments, the other MFEs also logically replicate the data message to the logical router. The logical router in some embodiments then logically replicates the multicast data message to the logical switches that are logically connected to DCNs that have reported as participating in the multicast group, for the logical switch to replicate to those DCNs.

The method also replicates the multicast data message from the first MFE to an MFE executing on a host machine that acts as an edge node of a logical network to connect the logical network to external networks. In some embodiments, a logical router component (e.g., service router) executing on the host machine acting as an edge node also acts as a multicast router and communicates with at least one external router to report participation in multicast groups (e.g., using protocol independent multicast (PIM) messages), sends multicast messages sourced within the logical network to the external router(s), and receives multicast messages from the external router(s). In some embodiments, a received multicast message is forwarded to MFEs that have reported interest in the multicast group of the received multicast message based on the summarized reports of the other MEs implementing the logical network.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Figure 2:
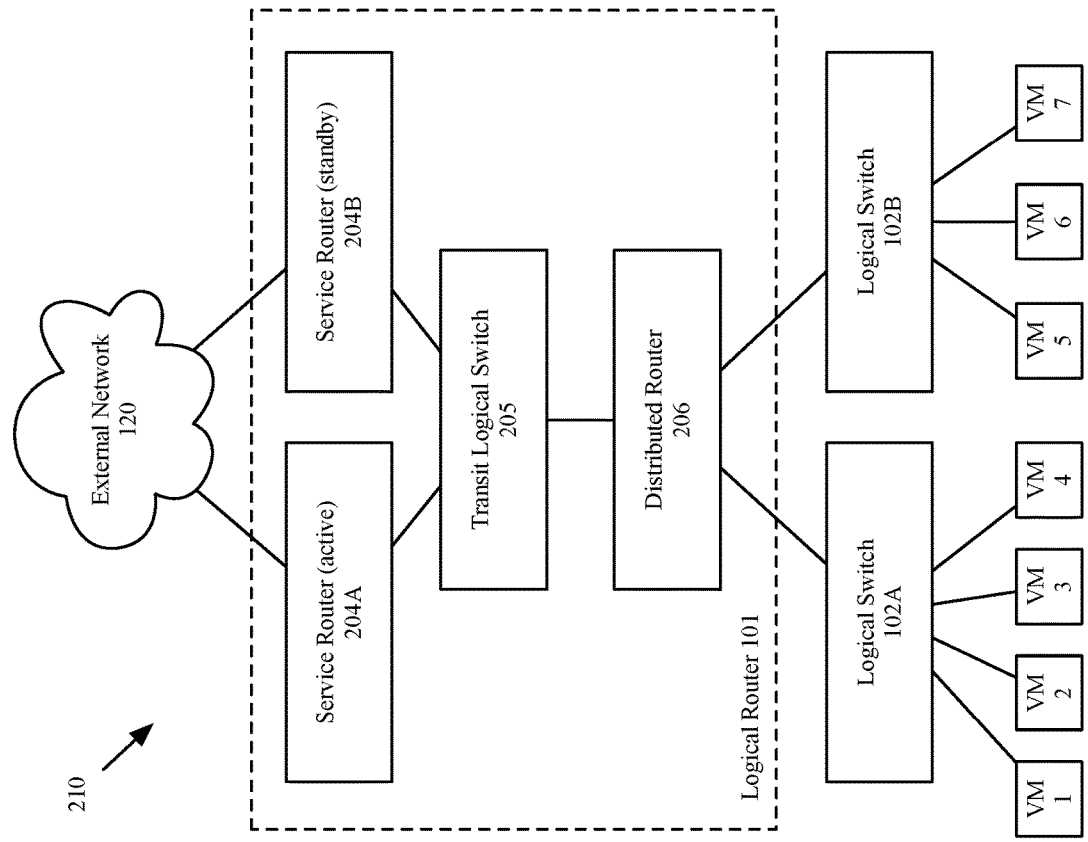
FIG. 2 conceptually illustrates a management plane view of the logical network of FIG. 1.
Figure 1:
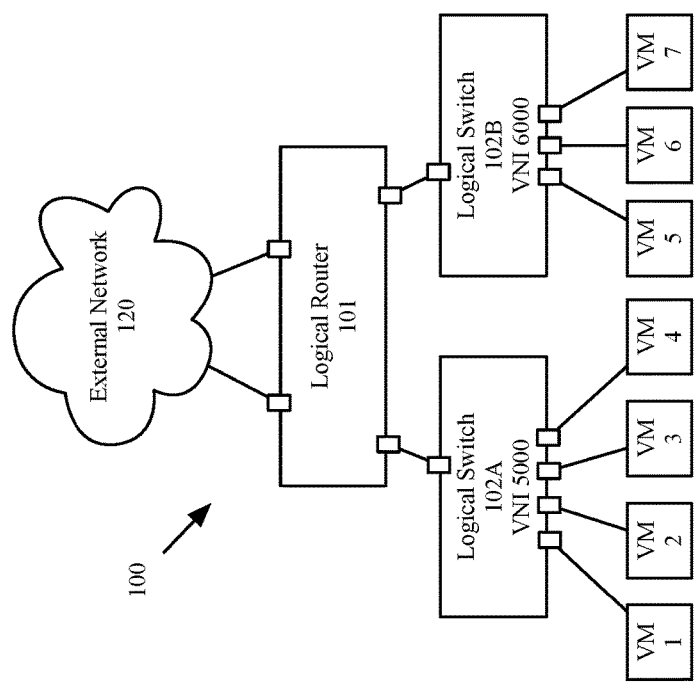
FIG. 1 conceptually illustrates a configuration view of a logical network.
Figure 3:
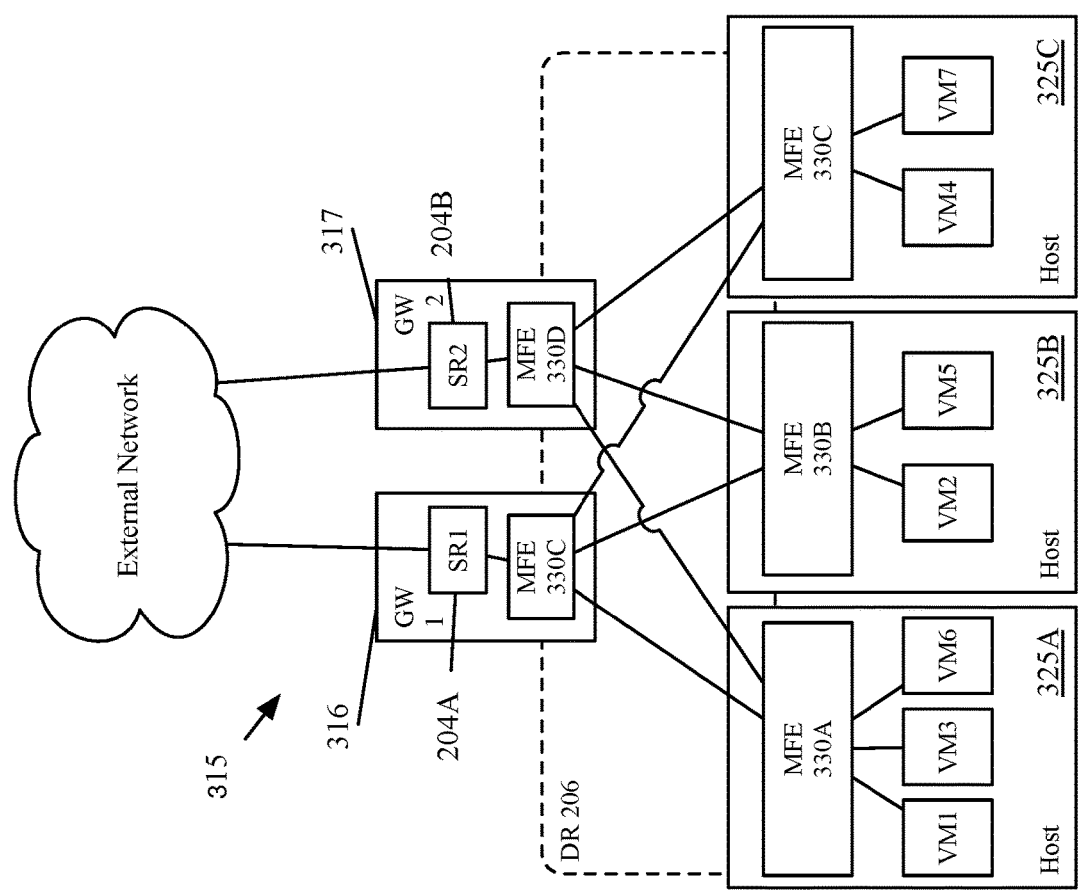
FIG. 3 conceptually illustrates a physical implementation of the logical network of FIG. 1.

For a managed network implementing at least one logical router having centralized and distributed components, some embodiments provide a method for processing multicast data messages at a first managed forwarding element (MFE) executing on a first host machine. The MFE implements a distributed multicast logical router and multiple logical switches logically connected to the logical router in conjunction with a set of additional MFEs executing on additional host machines. FIGS. 1, 2, and 3 illustrate configuration, management, and physical views of an exemplary network of some embodiments.

FIGS. 1 and 2 illustrate two different views of a user-defined logical network. A user-defined logical network as used in this application refers to a particular logical abstraction of a network. In some embodiments, the logical abstraction includes logical counterparts to network elements of a physical network such as forwarding elements (e.g., switches, hubs, routers, bridges, etc.), load balancers, and firewalls. The logical forwarding elements (e.g., a logical switch or logical router) in some embodiments are implemented by a set of MFEs (e.g., physical or virtual/software switches, or routers) executing on host machines. A particular host machine may host data compute nodes connected to multiple different logical networks and the set of MFEs implements all the logical networks to which the DCNs logically connect.

Configuration view 100 represents a logical network as designed by a user. As shown, the logical router 101 is part of the logical network that includes the logical router 101 and two logical switches 102A and 102B. The two logical switches 102A and 102B each have VMs that connect to logical ports. In some embodiments, the logical switches are virtual local area networks (VLANs) identified by virtual network identifiers (VNIs). While shown as VMs in these figures, it should be understood that other types of data compute nodes (e.g., containers, etc.) may connect to logical switches in some embodiments. The logical router 101 also includes two ports that connect to the external physical network 120. While shown with only one logical router, two logical switches, and seven DCNs (VMs) in the logical network, the logical network may include any number of logical routers, switches, and DCNs. In some embodiments, logical router 101 may also be configured by a user to provide network services (e.g., load balancing, network address translation, etc.).

Logical routers (LRs) can be implemented in either a distributed manner (e.g., with the logical router processing performed in first-hop MFEs that physically couple directly to the data compute nodes) or a centralized manner (with the logical router processing performed in gateways for both north-south and east-west traffic). For centralized implementations, logical routers may be scaled out by using multiple physical boxes in order to provide additional throughput (e.g., using equal-cost multi-path (ECMP) techniques) as well as for failure protection.

In some embodiments, the logical routers may only use stateful services if implemented at least partially in a centralized (e.g., clustered) manner (to avoid the need for state-sharing between the logical router implementations). In different embodiments, these gateways (that provide centralized aspects of logical routers, as well as which form the connection to the external network for distributed LRs) may be implemented as virtual machines (sometimes referred to as Edge VMs), in other types of data compute nodes (e.g., containers), or by using the Linux-based datapath development kit (DPDK) packet processing software (e.g., as a VRF in the DPDK-based datapath).

In the management plane view 210 of the logical network, the logical switches 102A and 102B are the same, but the network controller has created two service routers (SRs) 204A and 204B, a distributed router (DR) 206 and a transit logical switch 205 for the logical router 101 depicted in configuration view 100. In some embodiments, these SRs operate in active-standby mode, with one of the SRs active and the other operating as a standby (in case of the failure of the active SR). In some embodiments, the management plane generates separate routing information bases (RIBs) for each of the router constructs 204A, 204B, and 206. That is, in addition to having separate objects created in the management/control plane, each of the router constructs 204A, 204B, and 206 is treated as a separate router with separate routes. The transit logical switch 205 then has logical ports for each of these routers, and each of the router constructs has an interface to the transit logical switch.

FIG. 3 conceptually illustrates a set of physical machines implementing the logical structures depicted in FIGS. 1 and 2. FIG. 3 includes two separate gateway machines 316 and 317 that host the two service routers 204A and 204B, respectively. In some embodiments, hosts 316 and 317 also host MFEs 330 implementing the distributed logical router and the transit logical switch. In other embodiments, the service router implements the distributed logical router and the transit logical switch. FIG. 3 also illustrates a set of host machines 325 hosting a set of managed forwarding elements (MFEs) 330 that implement the logical switches 102A and 102B and the distributed logical router 206. The MFEs connect the VMs executing on the different host machines 325 to the logical network. Additional details of the structure and function of the logical router components are described in U.S. Patent Publication 2016/0226754 which is hereby incorporated by reference.

FIG. 3 illustrates the physical distributed implementation of the logical network depicted in configuration view 100. Each of the VMs that couples to one of the logical switches 102A and 102B in the logical network operates on a host machine 325. The MFEs 330 perform first-hop switching and routing for the logical switches 102A and 102B and for the logical distributed router 206 (in addition to performing switching and/or routing for other logical networks). As shown in FIG. 3, the distributed router 206 is implemented across the MFEs 330 as well as gateways 316 and 317. That is, the datapaths (e.g., in the MFEs 330, in a similar MFE in the gateways 316 and 317 or in a different form factor on the gateways) all include the necessary processing pipelines for the DR 206 (and the transit logical switch 205). Each MFE is capable of performing (logical) L2 processing for each logical switch, (logical) L3 processing for distributed routers, and tunneling a data message to another host machine on which a destination DCN in the logical network executes. Further details of the packet processing of some embodiments are described in U.S. Patent Publication 2016/0226754.

Figure 4:
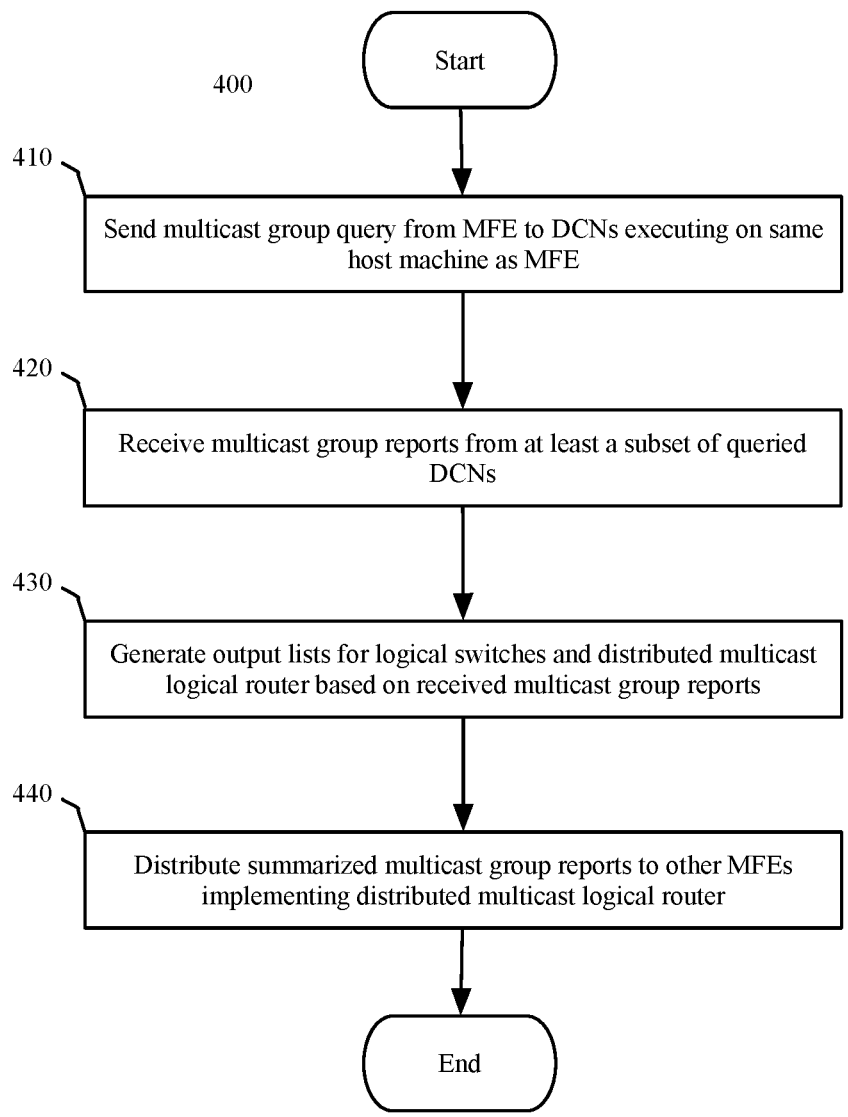
FIG. 4 conceptually illustrates a process of some embodiments for configuring MFEs to implement a distributed multicast logical router.

In some embodiments, a method is provided for configuring a set of MFEs implementing the distributed multicast logical router and multiple logical switches to process the multicast data messages. FIG. 4 conceptually illustrates a process for configuring MFEs to process multicast data messages in a distributed manner.

As used in this document, the terms data packet, packet, or message refer to a collection of bits in a particular format sent across a network. It should be understood that the term data packet, packet, or message may be used herein to refer to various formatted collections of bits that may be sent across a network, such as Ethernet frames, IP packets, TCP segments, UDP datagrams, etc. While the examples below refer to data packets, packets, or messages, it should be understood that the invention should not be limited to any specific format or type of data message. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

FIG. 4 conceptually illustrates a process 400 for generating multicast group data for an MFE to implement a distributed multicast logical router. In some embodiments, the process 400 is performed by an MFE executing on a first host machine. The process begins (at 410) by sending a multicast group query (e.g., an IGMP query) to a set of local DCNs executing on the same host machine as the MFE. A multicast group query in some embodiments is a data message that is used to determine which multicast groups are of interest to the queried DCNs (i.e., which multicast groups the DCNs participate in).

The process then receives (at 420) the multicast group reports from the queried DCNs. In some embodiments, each received report specifies at least one multicast group of interest to a DCN. In some embodiments, a DCN sends a separate multicast group report (e.g., an IGMP report) for each multicast group in which the DCN participates. In other embodiments, a multicast group report may specify multiple multicast groups in which the DCN participates, if it participates in more than one group. In some instances, the process will receive reports from only the DCNs that participate in at least one multicast group (i.e., if a DCN does not participate in any multicast groups, it will not send a report). In addition, the multicast group reports in some embodiments include leave reports that specify a multicast group in which a DCN no longer participates.

Next, the process generates (at 430) output lists for logical switches and the distributed multicast logical router based on the multicast group reports received from the local DCNs. An output list is generated for each logical switch having at least one local DCN (i.e., a DCN executing on the same host machine as the MFE implementing the logical switch) that participates (is interested) in a particular multicast group. The output list of a logical switch identifies the DCNs logically connected to the logical switch that should receive multicast data messages belonging to the particular multicast group. In some embodiments, for each logical switch logically connected to DCNs executing on a host machine on which the process is performed, an output list is generated for each multicast group with participating DCNs logically connected to the logical switch. An output list is also generated for the distributed multicast logical router (e.g., an mroute list) that identifies the logical switches that participate in the multicast group. The use of the output lists will be described in further detail in relation to FIGS. 8, 9, and 10.

The process distributes (at 440) a summarized multicast group report to other MFEs executing on other host machines implementing the distributed multicast logical router. In some embodiments, the summarized multicast group report is sent directly to the other MFEs over a logical switch that is not logically connected to DCNs (e.g., a transit logical switch). In these embodiments, the MFEs receiving the summarized report use the information to populate the output list for the distributed multicast logical router to replicate data messages specified in the summarized multicast group report to the source MFE. In other embodiments, the summarized multicast group report is distributed to the other MFEs through a set of central controller computers (e.g., a central control plane (CCP)) that aggregates summarized reports from multiple MFEs. The use of a set of central controller computers to distribute the multicast group data is described in relation to FIG. 5 below. The process ends.

Figures 5, 6:
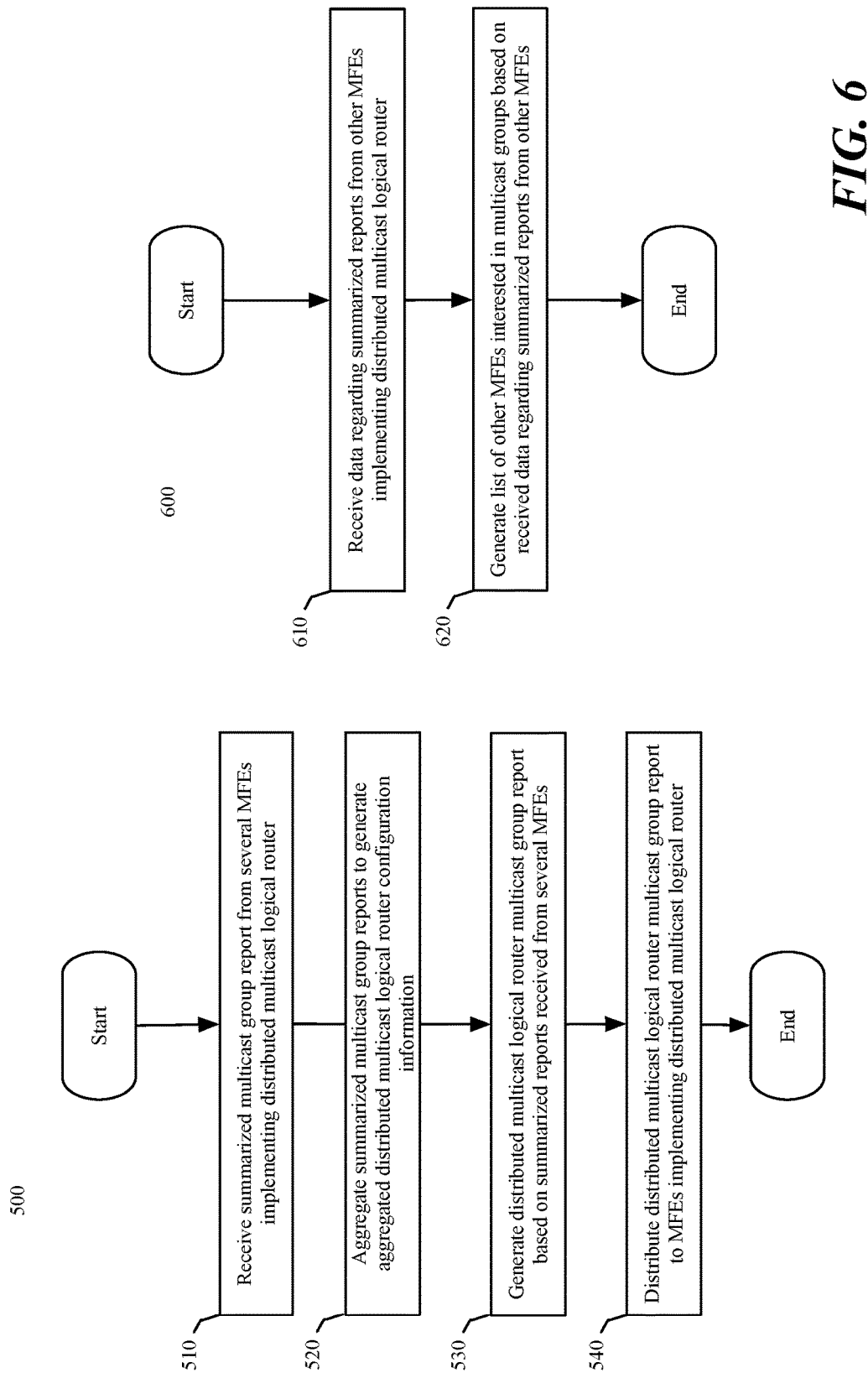
FIG. 5 conceptually illustrates a process of some embodiments for configuring MFEs to implement a distributed multicast logical router.
FIG. 6 conceptually illustrates a process of some embodiments used to generate local lists of MFEs or host machines that are interested in multicast groups.

FIG. 5 conceptually illustrates a process 500 that is used to aggregate summarized multicast group reports and provide data regarding the aggregated reports to MFEs implementing a distributed multicast logical router. In some embodiments, the process 500 is performed by a set of controller computers acting as a central control plane (CCP). The process begins by receiving (at 510) summarized multicast group reports from several MFEs implementing the distributed multicast logical router. In some embodiments, the summarized multicast group report from a source MFE specifies a set of multicast groups that DCNs executing on the same host machine as the source MFE participate in. In some embodiments, the MFEs send summarized reports upon a change to the multicast group participation of the MFE. In other embodiments, MFEs send summarized reports based on, for example, a randomized timer, a preset schedule, or a group participation expiration timer.

The process then generates (at 520) aggregated distributed multicast logical router configuration information based on the summarized multicast group reports. The aggregated distributed multicast logical router configuration information in some embodiments includes all the multicast groups that DCNs of the logical network participate in as well as identifying interested MFEs for each multicast group. The aggregated distributed multicast logical router configuration information in some embodiments identifies one or multiple of (1) the MFE, (2) the host machine on which the MFE executes, and (3) a tunnel endpoint (e.g. virtual extensible local area network (VXLAN) tunnel endpoint (VTEP)) executing on the same host machine as the MFE. The identification in some embodiments takes the form of a data link address (e.g., MAC address) or a network layer address (e.g., an internet protocol (IP) address) It is understood that these are merely examples of how an WE or host interested in a particular multicast group are identified and other methods will be apparent to one skilled in the art.

The process generates (at 530) at least one set of data to be used by the individual MFEs to implement the distributed multicast logical router. In some embodiments, an MFE-specific multicast group report is generated for each host machine or WE executing on a host machine that includes the information necessary for the WE to implement the distributed multicast logical router. For example, an WE-specific multicast group report in some embodiments only specifies other MFEs participating in multicast groups included in the summarized report from the specific WE (i.e., multicast groups that have at least one participating DCN that executes on the same host machine as the specific MFE). In other embodiments, the process does not generate MFE-specific multicast group reports, but rather generates a generic multicast group report based on the aggregated distributed multicast logical router configuration information that allows each MFE to populate its distributed multicast logical router output list for multicast groups that DCNs in the logical network participate in.

The process then distributes (at 540) the multicast group reports generated based on the aggregated distributed multicast logical router configuration information to the MFEs (e.g., through local controllers executing on the same host machines as the MFEs). As described above, the distributed information in some embodiments is MFE-specific, while in others it is the same for all MFEs. The MFEs can then use the received information to populate their output lists for each multicast group as described above in relation to FIG. 6 below. In some embodiments, after an initial configuration process, the process may only distribute information in the multicast group reports indicating changes to the aggregated distributed multicast logical router configuration information for the MFEs to use to update existing output lists.

FIG. 6 conceptually illustrates a process 600 that is used to generate local lists of MFEs or host machines that are interested in multicast groups. In some embodiments, the process 600 is performed by an MFE executing on a host machine. In other embodiments, another module on the host machine performs process 600. The process receives (at 610) data regarding the summarized reports sent from other MFEs implementing the distributed multicast logical router. In some embodiments, the summarized multicast group report is received directly from the other MFEs over a logical switch that is not associated with DCNs (e.g., a transit logical switch). In other embodiments, the data regarding the summarized multicast group reports is received from a set of central controller computers (e.g., a central control plane (CCP)) that aggregates summarized reports from multiple MFEs as described above in relation to FIG. 5.

Based on the received data regarding the summarized reports from the other MFEs, the process generates (at 620) an output list of MFEs that participate in multicast groups. An output list identifies MFEs to which multicast data messages for each multicast group are replicated. The MFEs in some embodiments are identified by a media access control (MAC) address or an internet protocol (IP) address associated with the MFE or a tunnel endpoint executing on the same host machine as the MFE. In some embodiments, the distributed multicast logical router maintains a list for each multicast group in which any DCN in the logical network participates. In other embodiments, the output list of an MFE includes only those multicast group in which a local DCN (i.e., a DCN executing on the same host machine as the MFE) participates. The process then ends.

Figure 7:
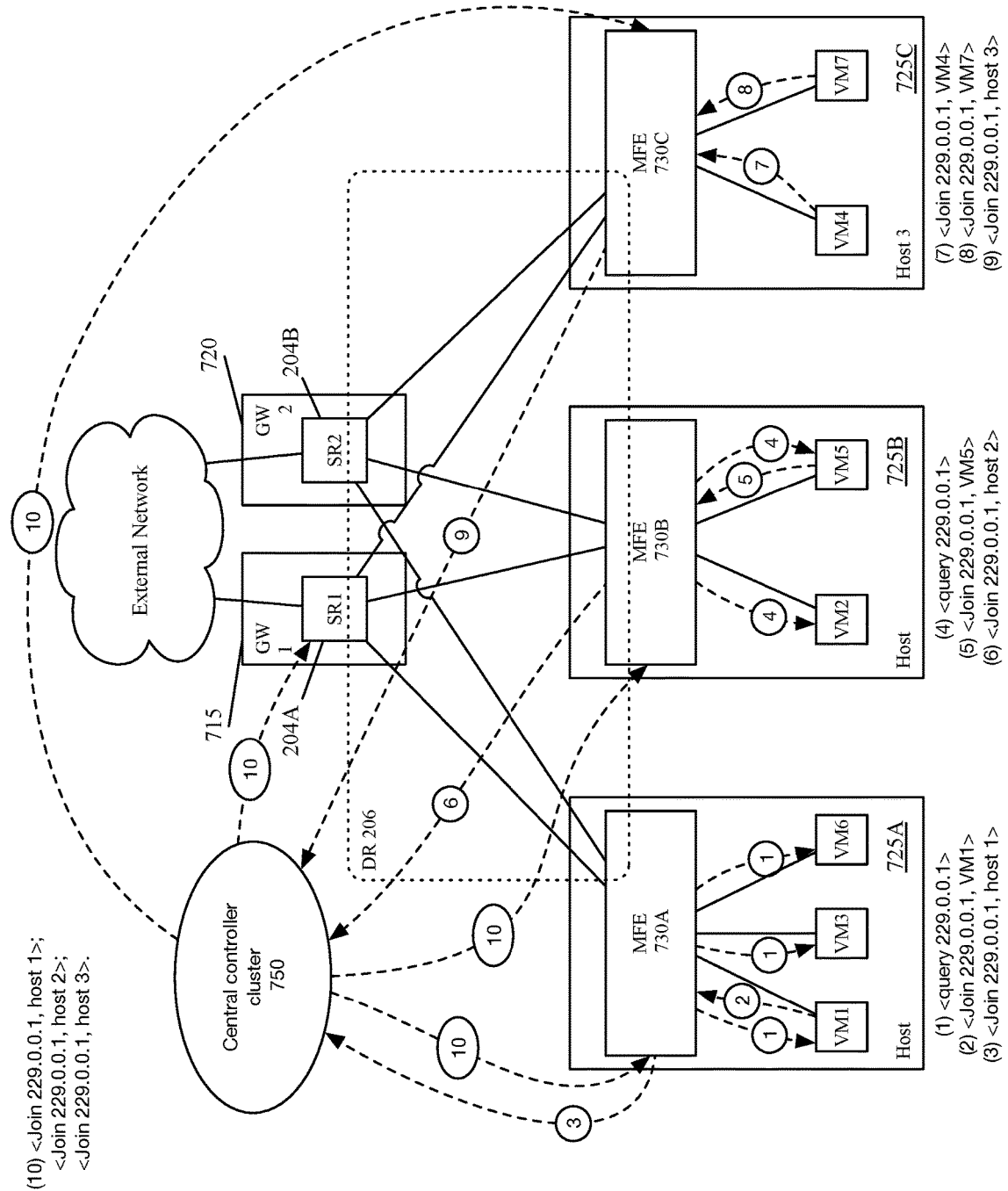
FIG. 7 conceptually illustrates a physical system carrying out an embodiment of the processes of FIGS. 4 and 5.

FIG. 7 conceptually illustrates the multicast group report flow in an embodiment of the process of FIG. 4. Specifically, FIG. 7 conceptually illustrates the use of a central controller cluster 750 to aggregate the summarized multicast group reports. In data messages 1, MFE 730A sends multicast group (e.g., IGMP) queries to a set of DCNs (VMs 1, 3, and 4) executing on host 725A to determine if any DCNs on the host machine are interested in, or participating in, any multicast group. FIG. 7 specifically illustrates that data message 1 includes a query for a multicast group identified by the IP address 229.0.0.1. In some embodiments, a single query references multiple multicast groups. A multicast group is sent out for each multicast group in some embodiments.

Data message 2 represent a multicast group (e.g., IGMP or multicast listener discovery (MLD) report from a DCN in response to the query from the MFE. In some embodiments, reports are sent from a particular DCN (e.g., VM1, VM4, and VM7) independent of a query when the DCN joins or leaves a multicast group. Additionally, in some embodiments, data message 2 represents a set of multicast group reports. The set of multicast group reports is empty for a DCN that is not participating in any multicast groups. If a DCN participates in multiple multicast groups, in some embodiments, data message 2 represents multiple multicast group reports, each for a different multicast group that the DCN participates in. In other embodiments, a single multicast group report includes multiple multicast groups that a DCN participates in.

The MFE in some embodiments summarizes the reports received in data messages 2 to create a summarized multicast group report for distribution to the other MFEs implementing the distributed multicast logical router. Data message 3 represents the MFE 730A sending the summarized multicast group report to central controller cluster 750. Data message 3 in some embodiments includes information identifying the multicast group of interest (e.g., 229.0.0.1), the host machine (e.g., IP and MAC address of a tunnel endpoint executing on the host machine), and a virtual network identifier (VNI) that identifies the logical network (e.g., VLAN or VXLAN) to which interested DCNs connect.

Other MFEs implementing the distributed multicast logical router also send similar data messages to determine the multicast groups in which DCNs executing on the same host machine participate. For example, MFE 730B sends a multicast group query for multicast group with IP 229.0.0.1 as data message 4, receives a set of multicast group reports as data message 5, creates a summarized multicast group report, and distributes data message 6 to central controller cluster 750.

Data messages 7 and 8 depicts multicast group reports sent from DCNs not in response to a query from MFE 730C. In some embodiments, data messages 7 and 8 are sent from DCNs that connect to different logical networks implemented, for example, as VLANs or VXLANs identified by VNIs. The MFE snoops the multicast group reports from these DCNs in some embodiments to populate a local output list to which it distributes multicast packets for the particular multicast group. MFE 730C then sends data message 9 to central controller cluster 750.

Data messages 10 are distributed by central controller cluster 750 after multiple summarized reports have been received in, for example, data messages 3, 6, and 9. In some embodiments, central controller cluster 750 sends out, as data messages 10, the multicast group reports it generates based on data messages 3, 6, and 9. In some embodiments, data messages 10 are sent every time a new summarized multicast group report is received from an MFE. In other embodiments, data messages 10 are sent every time a summarized multicast group report is received that changes the aggregated distributed multicast logical router configuration information in a way that requires an update to at least one MFE's output list. As discussed above, data messages 10 may represent different information for each MFE based on the multicast groups specified in the summarized multicast group report received from the MFE. In some embodiments, only a subset of MFEs receive the information as part of data messages 10.

In some embodiments, a local multicast router for the network serviced by service router 204 also receives the aggregated multicast group report to allow it to process multicast group messages received from outside the network efficiently. In some embodiments, the local multicast router (e.g., service router 204A) communicates with external routers using protocol independent multicast (PIM) to direct multicast messages from sources external to the network to the local multicast router. The local multicast router uses PIM to indicate participation in at least each multicast group in which any DCN of the logical network participates.

Some embodiments provide a method for processing multicast data messages at a first managed forwarding element (MFE) executing on a first host machine that implements a distributed multicast logical router. The method is conceptually illustrated in FIGS. 8 and 10.

Figure 8:
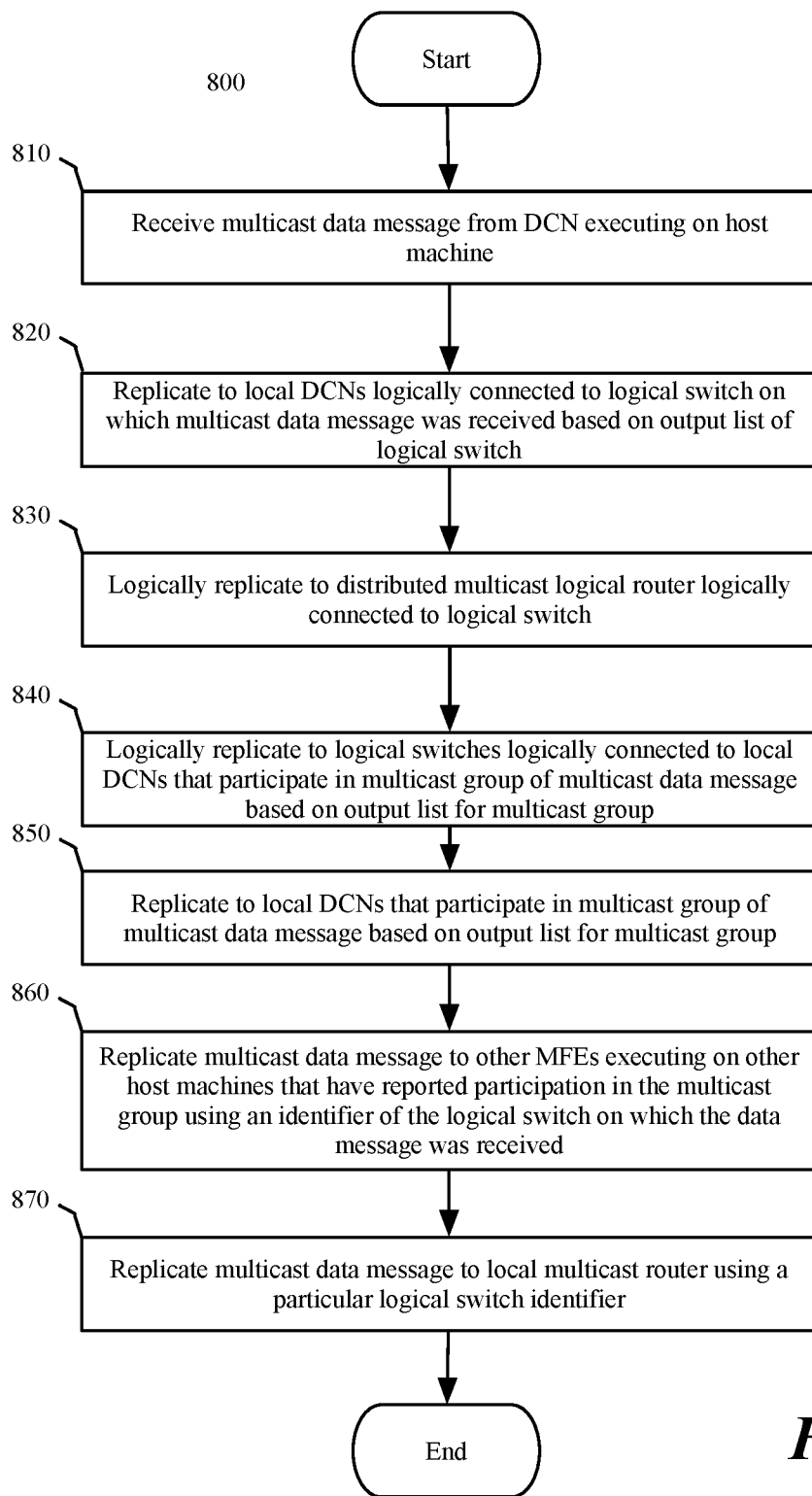
FIG. 8 conceptually illustrates a process of some embodiments for replicating multicast data messages sourced in the logical network to DCNs in the logical network.

FIG. 8 conceptually illustrates a process 800 for processing multicast data messages sent from a DCN in the logical network. In some embodiments, process 800 is performed by the MFE implementing the distributed multicast logical router that executes on the same host as the DCN from which the multicast data message is sent. In discussing FIG. 8, references will be made to FIGS. 9 and 10 which conceptually illustrate a configuration view 900 of a logical network and a set of data messages that are sent in exemplary physical implementation 1010 as part of performing process 800. In some embodiments, a multicast data message indicates a particular multicast group as a destination of the data message.

Process 800 begins by receiving (at 810) a multicast data message from a DCN operating on a particular host machine. This corresponds to data message 1 in FIG. 10 which shows VM1 (a virtual machine being one example of a DCN) which is logically connected to logical switch 902A sending a multicast data message to MFE 1030A executing on the same host machine as VM1 (i.e. host machine 1025A).

Figure 10:
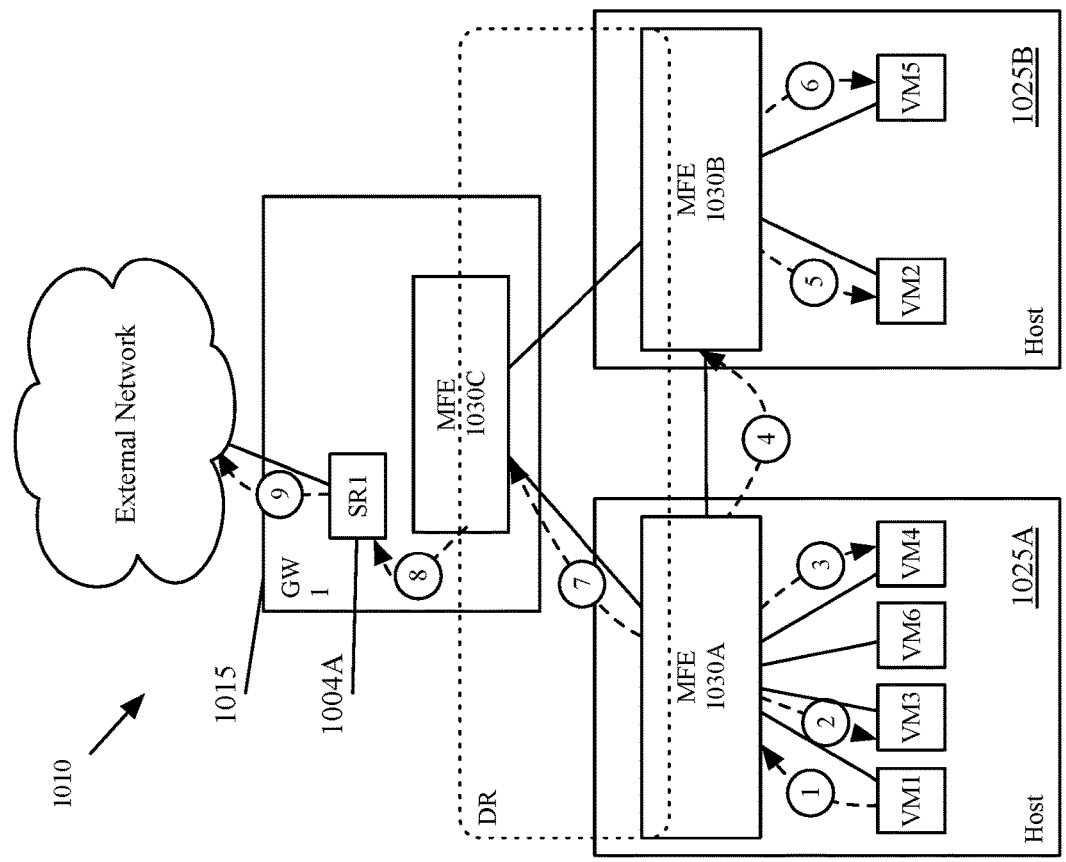
FIG. 10 conceptually illustrates a physical system carrying out an embodiment of the process of FIG. 8 in the logical network illustrated in FIG. 9.
Figure 9:
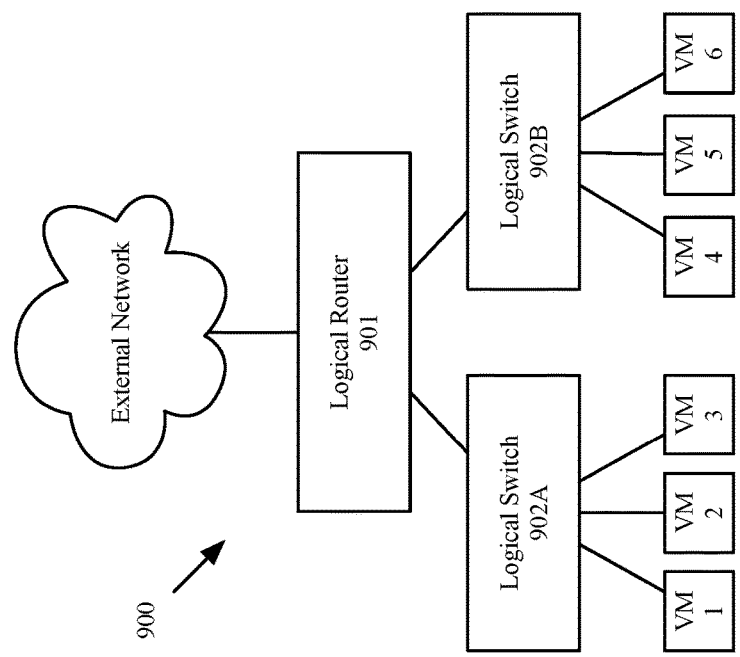
FIG. 9 conceptually illustrates a configuration view of a logical network in which the process of FIG. 8 is carried out.

After receiving the multicast data message, the process replicates (at 820) the multicast data message to local DCNs logically connected to the logical switch to which the source DCN logically connects. In FIG. 10 this is indicated by data message 2 which shows MFE 1030A sending the replicated multicast data message to VM3 which is logically connected to logical switch 902A as shown in configuration view 900 of the network. While only a single local DCN (VM3) logically connected to logical switch 902A is depicted in FIG. 9 it is understood that in some embodiments, there are multiple DCNs logically connected to each logical switch and that a subset (including all or none) of those connected DCNs participate in the multicast group.

The process then replicates (at 830) the multicast data message to the distributed multicast logical router logically connected to the logical switch. In some embodiments, a single MFE module or program executes both the logical switch and distributed multicast logical router implementations and so the replication is a logical process within the MFE. In terms of configuration view 900, the process (at 830) logically replicates the multicast data message from logical switch 902A to the logical router 901 of which the distributed multicast logical router is a component.

The process then logically replicates (at 840) the multicast data message to other logical switches that are logically connected to local DCNs that participate in the multicast group of the multicast data message. In FIG. 10 this process is not shown as it is internal to MFE 1030A. In some embodiments, the logical replication is based on the output list generated from the multicast group reports received from the DCNs executing on the same host machine as the MFE performing the logical processing of the multicast data message.

After logically replicating the multicast data message to the logical switches, the logical switches replicate (at 840) the multicast data messages to the local DCNs that (1) logically connect to the logical switch and (2) participate in the multicast group. In some embodiments, the replication is based on an output list populated based on multicast group reports sent from the DCNs to the MFE implementing the distributed multicast logical router. This replication (at 840) corresponds to data message 3 in FIG. 10 in which the MFE replicates the multicast data message to VM4 after logically replicating the multicast data message to logical switch 902B to which VM4 logically connects. FIG. 10 also illustrates that VM6 which is logically connected to logical switch 902B, but not participating in the multicast group, does not receive the replicated multicast data message. It is understood that in some embodiments many DCNs operate on each host machine and are logically connected to several logical switches but do not participate in a particular multicast group and do not therefore receive multicast data messages for those multicast groups. FIG. 10 depicts only two logical switches, two host machines executing MFEs, and six VMs in order to present a more limited logical environment that makes it easier to understand the basic structure of the multicast data message processing. However, a logical network in some embodiments includes additional logical switches and DCNs, and the physical network includes additional host machines and MFEs. Additionally, a host machine may host DCNs belonging to multiple logical networks that have logical network elements implemented by the MFE executing on the host machine.

The process (at 860) replicates the multicast data message to other MFEs executing on other host machines that have reported participation in the multicast group of the multicast data message. In some embodiments, these replicated multicast data messages are sent over tunnels (indicated in FIG. 10 as solid lines connecting MFEs). The tunnels are used to implement overlay logical networks (e.g., virtual local area networks (VLANs) or virtual extensible LANs (VXLANs)). When using tunnels to implement overlay networks, some embodiments require a virtual (or logical) network identifier (VNI) that identifies the VLAN or VXLAN to which the packet belongs. In some embodiments, the replicated multicast data message is sent to the other MFEs over the logical switch on which it was received (e.g., using a logical switch identifier (e.g., VNI) associated with logical switch 902A). In some embodiments, the time to live (TTL) of the packet is not decremented as part of the process of replicating to the other MFEs executing on other host machines. The replication to other MFEs is depicted by data message 4 of FIG. 10 in which the multicast data message is sent from MFE 1030A to MFE 1030B. It is understood that replicating to other MFEs in some embodiments takes place before or at the same time as replicating to the logical switches and ultimately the local participating DCNs. It is also understood that some MFEs in the physical network do not participate in a given multicast group and multicast data messages for that multicast group are not replicated to those MFEs.

The process replicates (at 870) the multicast data message to the MFE executing on the same host machine as the local multicast router that connects to an external network. In some embodiments, the local multicast router is a logical local multicast router selected from a set of one or more active service routers executing on a set of host machines acting as gateways for the logical network. Data message 7 of FIG. 10 illustrates MFE 1030A replicating the multicast data message to MFE 1030C. MFE 1030C uses it output list to replicate the received multicast data message to the service router 1004A as data message 8. The service router 1004A then replicates, as data message 9, the multicast data message to the external router.

FIG. 10 also illustrates multicast data message processing by MFE 1030B. MFE 1030B receives the multicast data message over the source logical switch as data message 4 and replicates it to DCNs logically connected to logical switch 902A (e.g., VM2). MFE 1030B then replicates to other logical switches and ultimately to the DCNs participating in the multicast group that are logically connected to the logical switches based on the output lists of the logical switches. However, MFE 1030B does not replicate to other MFEs or to the local multicast router so as to avoid replicating data messages to MFEs that have already received the replicated data message. In some embodiments, the MFE determines whether to replicate a multicast data message to other MFEs based on the source of a multicast data message. In some embodiments, if the source is a DCN executing on the same host as the MFE, the MFE performs process 800, but if the multicast data message is received, for example, at a tunnel endpoint executing on the host machine, from a source DCN executing on another host machine, the MFE replicates the multicast data message locally as depicted for MFE 1030B but does not send data messages corresponding to data messages 4 and 7 that are depicted as being performed by MFE 1030A.

FIG. 10 also depicts MFE 1030C that executes on the same host machine acting as an edge node on which active service router 1004A executes. In some embodiments, MFE 1030C has an output list, for multicast messages received through a tunnel from another MFE implementing the logical network, that includes only service router 1004A, as no other DCNs execute on the same host machine as MFE 1030C.

Figure 11:
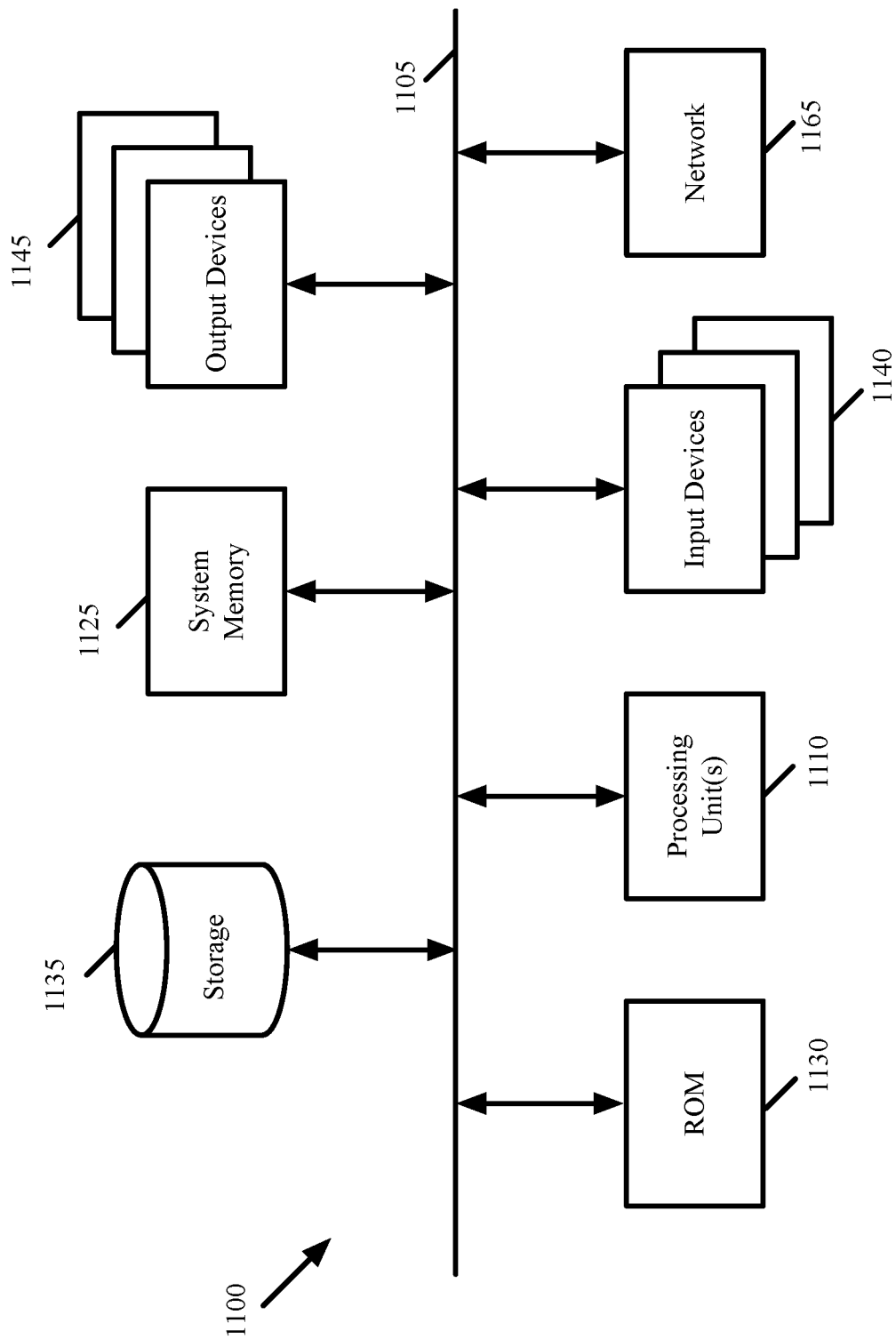
FIG. 11 conceptually illustrates an electronic system with which some embodiments of the invention are implemented.

FIG. 11 conceptually illustrates an electronic system 1100 with which some embodiments of the invention are implemented. The electronic system 1100 can be used to execute any of the control, virtualization, or operating system applications described above. The electronic system 1100 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the system memory 1125, and the permanent storage device 1135.

From these various memory units, the processing unit(s) 1110 retrieve instructions to execute and data to process in order to execute the processes of the invention. The processing unit(s) may be a single processor or a multi-core processor in different embodiments.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash drive, etc.) as the permanent storage device. Like the permanent storage device 1135, the system memory 1125 is a read-and-write memory device. However, unlike storage device 1135, the system memory is a volatile read-and-write memory, such as random access memory. The system memory stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieve instructions to execute and data to process in order to execute the processes of some embodiments.

The bus 1105 also connects to the input and output devices 1140 and 1145. The input devices enable the user to communicate information and select commands to the electronic system. The input devices 1140 include alphanumeric keyboards and pointing devices (also called "cursor control devices"). The output devices 1145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 11, bus 1105 also couples electronic system 1100 to a network 1165 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host machine using resources of the host machine virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 4, 5, and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for configuring a plurality of managed forwarding elements (MFEs) executing on a plurality of host computers to implement a distributed multicast logical router, the method comprising:
   receiving a summarized multicast group report from each of the plurality of MFEs indicating multicast groups joined by a set of DCNs executing on one host computer with the MFE;
   generating an aggregated multicast group report based on the received summarized multicast group reports; and
   sending configuration data to the plurality of MFEs based on the aggregated multicast group report to configure the plurality of MFEs to implement the distributed multicast logical router,
   wherein a summarized multicast group report sent by a particular host computer comprises (i) an identifier of the particular host computer and (ii) identifiers for the multicast groups joined by at least one DCN executing on the particular host computer.

2. The method of claim 1, wherein the identifier of the particular host computer is at least one of an internet protocol (IP) address and a media access control (MAC) address.

3. The method of claim 2, wherein the identifier of the particular host computer is an identifier of a tunnel endpoint executing on the particular host computer.

4. The method of claim 1, wherein the identifiers for the multicast groups are internet protocol (IP) addresses associated with the multicast groups.

5. The method of claim 4, wherein a multicast group report is sent from a DCN based on interest from an application executing on the DCN.

6. The method of claim 1, wherein the summarized multicast group report received from each MFE is based on a set of multicast group reports from a set of DCNs executing on one host computer with the MFE, each multicast group report indicating a multicast group that a DCN in the set of DCNs is joining.

7. The method of claim 6, wherein a snooping function is performed on the set of multicast group reports received by each MFE to determine multicast groups to include in the summarized multicast group report from the MFE.

8. The method of claim 1, wherein configuring a particular MFE in the plurality of MFEs to implement the distributed multicast logical router comprises using the configuration data to populate a multicast forwarding table of the MFE.

9. A method for configuring a plurality of managed forwarding elements (MFEs) executing on a plurality of host computers to implement a distributed multicast logical router, the method comprising:
   receiving a summarized multicast group report from each of the plurality of MFEs indicating multicast groups joined by a set of DCNs executing on one host computer with the MFE;
   generating an aggregated multicast group report based on the received summarized multicast group reports; and
   sending configuration data to the plurality of MFEs based on the aggregated multicast group report to configure the plurality of MFEs to implement the distributed multicast logical router by populating multicast forwarding tables of the MFEs,
   wherein a multicast forwarding table is used by a particular MFE to forward a received multicast data message for a particular multicast message group to only those host computers that have reported an interest in the particular multicast message group.

10. A non-transitory machine readable medium storing a program which when executed by at least one processing unit configures a plurality of managed forwarding elements (MFEs) executing on a plurality of host computers to implement a distributed multicast logical router, the program comprising sets of instructions for:
   receiving a summarized multicast group report from each of the plurality of MFEs indicating multicast groups joined by a set of DCNs executing on one host computer with the MFE;
   generating an aggregated multicast group report based on the received summarized multicast group reports; and
   sending configuration data to the plurality of MFEs based on the aggregated multicast group report to configure the plurality of MFEs to implement the distributed multicast logical router,
   wherein a summarized multicast group report sent by a particular host computer comprises (i) an identifier of the particular host computer and (ii) identifiers for the multicast groups joined by at least one DCN executing on the particular host computer.

11. The non-transitory machine readable medium of claim 10, wherein the identifier of the particular host computer is at least one of an internet protocol (IP) address and a media access control (MAC) address.

12. The non-transitory machine readable medium of claim 11, wherein the identifier of the particular host computer is an identifier of a tunnel endpoint executing on the particular host computer.

13. The non-transitory machine readable medium of claim 10, wherein the identifiers for the multicast groups are internet protocol (IP) addresses associated with the multicast groups.

14. The non-transitory machine readable medium of claim 13, wherein a multicast group report is sent from a DCN based on interest from an application executing on the DCN.

15. The non-transitory machine readable medium of claim 10, wherein the summarized multicast group report received from each MFE is based on a set of multicast group reports from a set of DCNs executing on one host computer with the MFE, each multicast group report indicating a multicast group that a DCN in the set of DCNs is joining.

16. The non-transitory machine readable medium of claim 15, wherein a snooping function is performed on the set of multicast group reports received by each MFE to determine multicast groups to include in the summarized multicast group report from the MFE.

17. The non-transitory machine readable medium of claim 10, wherein configuring a particular MFE in the plurality of MFEs to implement the distributed multicast logical router comprises using the configuration data to populate a multicast forwarding table of the MFE.

18. A non-transitory machine readable medium storing a program which when executed by at least one processing unit configures a plurality of managed forwarding elements (MFEs) executing on a plurality of host computers to implement a distributed multicast logical router, the program comprising sets of instructions for:
  receiving a summarized multicast group report from each of the plurality of MFEs indicating multicast groups joined by a set of DCNs executing on one host computer with the MFE;
  generating an aggregated multicast group report based on the received summarized multicast group reports; and
  sending configuration data to the plurality of MFEs based on the aggregated multicast group report to configure the plurality of MFEs to implement the distributed multicast logical router by populating multicast forwarding tables of the MFEs,
  wherein a multicast forwarding table is used by a particular MFE to forward a received multicast data message for a particular multicast message group to only those host computers that have reported an interest in the particular multicast message group.

* * * * *